Figure 1:
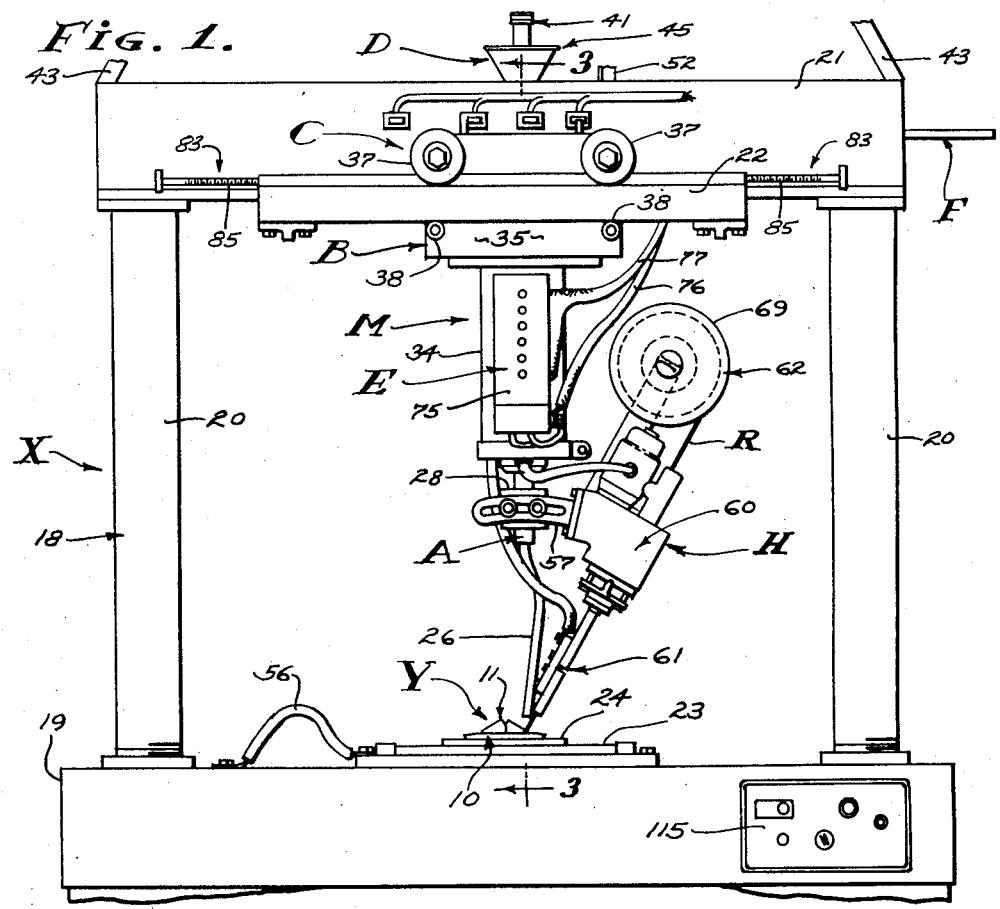

Sept. 8, 1959     E. L. LAUNDER ET AL     2,903,566
MOUNTING FOR A WELDING HEAD IN A WORK FABRICATING MACHINE
Filed July 29, 1957     4 Sheets-Sheet 1

INVENTORS.
ERNIE L. LAUNDER
ALLEN W. LOUDON
MAX FREDERICK Jr.

BY W. H. Maxwell
AGENT

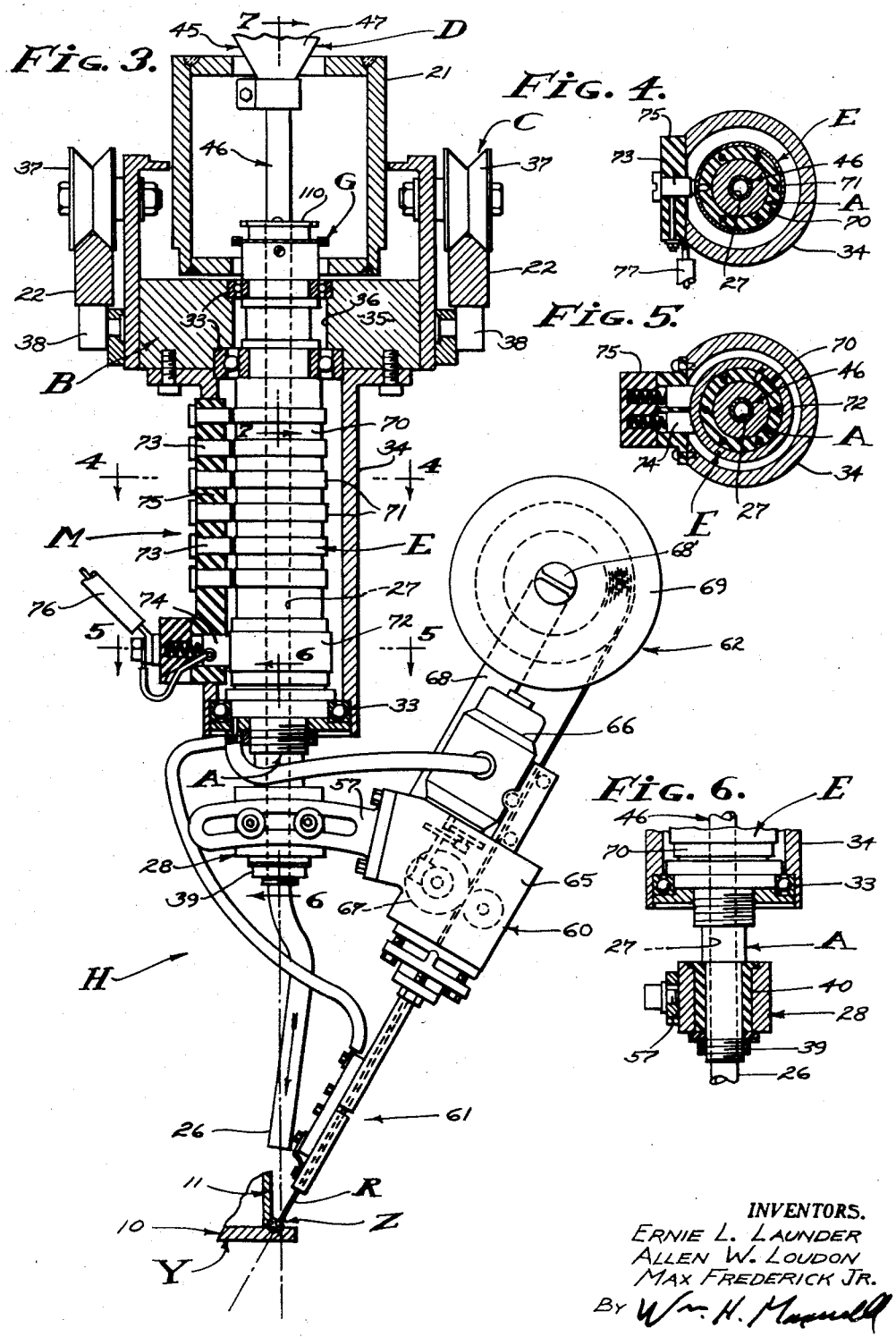

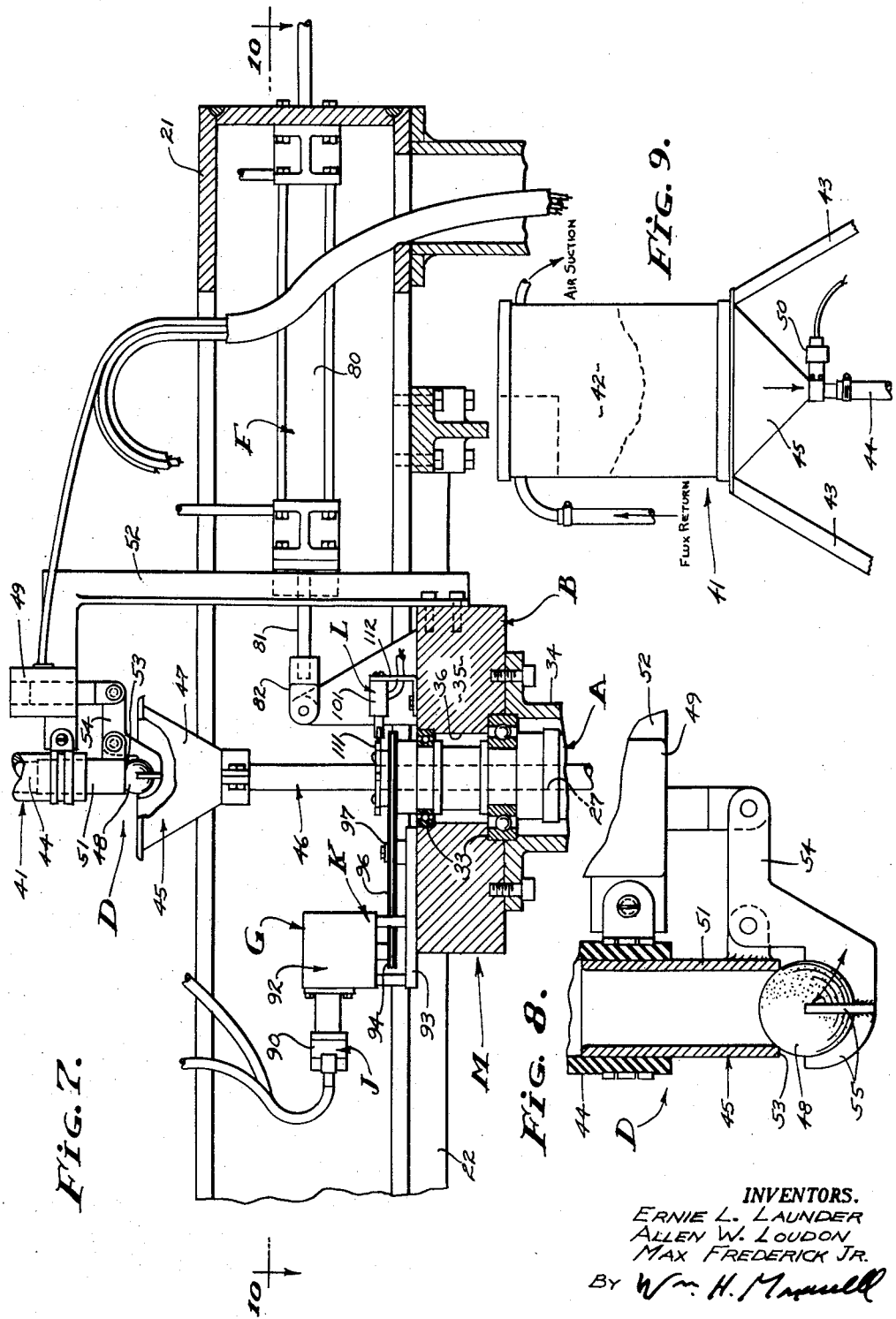

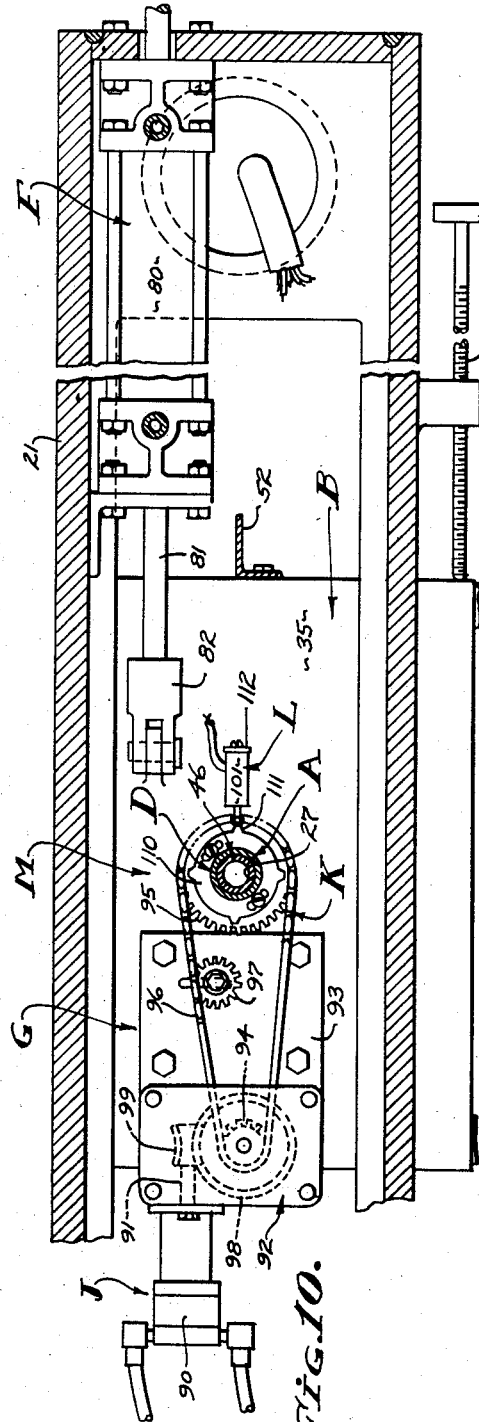

United States Patent Office 2,903,566
Patented Sept. 8, 1959

2,903,566

MOUNTING FOR A WELDING HEAD IN A WORK FABRICATING MACHINE

Ernie L. Launder, Montebello, Allen W. Loudon, Downey, and Max Frederick, Jr., Whittier, Calif., assignors to H. & L. Tooth Company, Montebello, Calif., a corporation of California Application July 29, 1957, Serial No. 674,754

16 Claims. (Cl. 219—125)

This invention has to do with a mounting for a welding head in a work fabricating machine, it being a general object of the invention to provide a mounting that movably carries a welding head and which is operable to handle an electric current and welding materials in connection with the work or process carried on as the machine operates, so that the work is accurately, securely and dependably welded at various points, for instance, continuously about a particular portion, or as circumstances may require.

This is a continuation in part of application Serial No. 338,292 filed February 24, 1953, entitled Work Fabricating Machine, now Patent No. 2,835,786.

Work fabricating machines of the type under consideration are employed to assemble and weld parts together and may be automatically or semi-automatically operated. These machines commonly employ electric arc welding involving a welding head that travels relative to the work being assembled and which feeds welding rod and flux to the work in the presence of a rather high current of electricity, to the end that welding material is continuously applied to the work. The seams of welding applied by the machines is sometimes straight, but may be rectilinear and even curved. In any case, the tip or active end of the welding rod must be replaced at the exact point of welding by continuously advancing the rod, and the arc at the point of weld must be continuously immersed in a bath of flux. In the case illustrated, the seams of welding are other than straight, so that it is necessary to turn the welding head in order to approach different sides of the work, and in this case means must be devised in order to handle the electrical current, the supply of welding rod, and the supply of flux, said means allowing for free rotation of the welding head during operation of the machine.

An object of the invention is to provide a mounting for a welding head in a work fabricating machine that rotatably carries the head to accurately and dependably align it with the point of weld on the parts being worked upon and assembled by the machine.

Another object of the invention is to provide a mounting for a welding head in a machine of the character referred to that rotatably carries the head and supplies a multiplicity of electrical currents thereto, said currents being employed to operate means to advance the welding rod to the point of weld and to create the arc for generating heat at the point of weld.

Another object of this invention is to provide a mounting for a welding head in a machine of the general character referred to that rotatably carries the head and continuously supplies flux to the point of weld as the work progresses.

Another object of this invention is to provide a mounting for a welding head in a machine of the general character referred to that controls the flow of flux by a simple combination and arrangement of parts that forms an inexpensive valve that is practical and dependable under normal operating conditions of said machine.

It is still another object of this invention to provide a mounting for a head in a welding machine that rotates and has a drive adapted to turn the head predetermined amounts at predetermined times during each cycle of operation of the machine. That is, the drive provided is adapted to rotate the head and related parts one step at a time in a predetermined manner.

Another object of this invention is to provide a mounting for a welding head of the general character referred to characterized by a simple combination and relationship of parts which make for simple, reasonable inexpensive manufacture, as well as practical and rapid operations of said machine.

Figure 2:
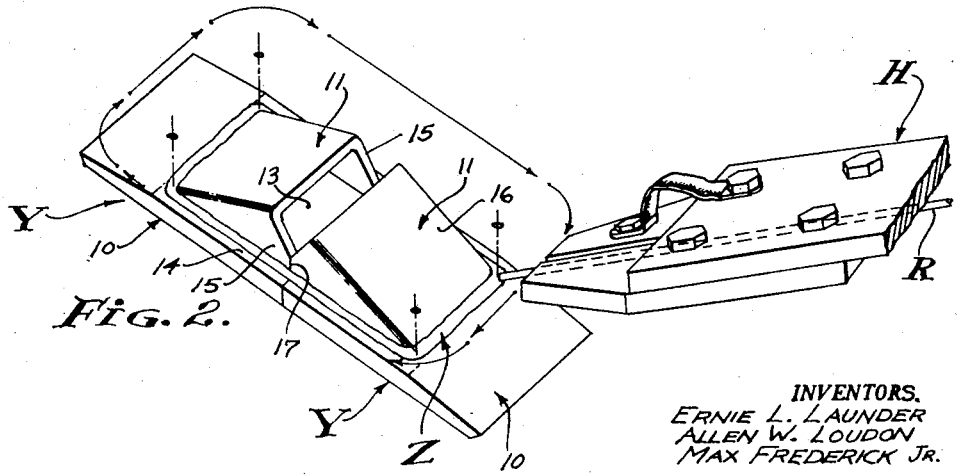

The various objects and features of the invention will be fully understood from the following detailed description of a typical preferred form and application of the invention, throughout which description reference is made to the accompanying drawings, in which:

Fig. 1 is a front elevation of a machine employing the mounting of the present invention, and showing a piece of work in the machine being acted upon by the head. Fig. 2 is an enlarged perspective view showing a typical piece of work being acted upon by the head of the machine, as shown in Fig. 1. Fig. 3 is an enlarged detailed sectional view taken substantially as indicated by line 3—3 on Fig. 1, part of the structure being rotated in order to show in side elevation. Figs. 4 and 5 are transverse sectional views taken as indicated by lines 4—4 and 5—5 on Fig. 3. Fig. 6 is a sectional view taken as indicated by line 6—6 on Fig. 3. Fig. 7 is an enlarged sectional view taken as indicated by line 7—7 on Fig. 3. Fig. 8 is an enlarged detailed view of a portion of the structure shown in Fig. 7. Fig. 9 is a view of the flux supply that is carried at the upper part of the structure illustrated in Fig. 1. Fig. 10 is a plan section taken as indicated by line 10—10 on Fig. 7. Fig. 11 is a view of a portion of the structure shown in Fig. 10 and showing a different operative position, and Fig. 12 is a diagrammatic view showing the electrical circuit employed to operate the mechanism shown in Figs. 7, 10, and 11.

The present invention provides a mounting for a welding head in a work fabricating machine X that can be used to advantage to assemble or fabricate various parts of work and, since it is particularly practical as applied to the fabrication of digger teeth Y, it is shown in a form designed for that purpose, and in the drawings, digger teeth of typical form are set forth. For example, in Figs. 1 and 2 there is illustrated a digger tooth cap construction Y characterized by a flat heavy blade 10 and a cup-like sheet metal body 11 which is applied to one side of the blade to establish a tapered or converging cup-shaped opening 13 adapted to receive a tooth shank. The cap construction, as shown in the drawings, involves the body 11 having sides 15 and an end 16 that engages the back side 14 of the blade, and the machine of the present invention is provided to apply welding Z to join the sides 15 and 16 of the body 11 to the blade 10.

To facilitate rapid production it is preferred that the machine of the present invention be employed to handle two caps Y simultaneously, in which case the blades 10 of these two caps are arranged end to end, so that the blades are oppositely disposed. The bodies 11 of the two caps are arranged on the blades, and in the case illustrated, the abutting ends of the blades 10 are flat at 17. With the cap parts just referred to arranged, as shown in Fig. 2, a single continuous line of welding Z may be applied in rectangular form to extend around the two related caps, effectively joining the bodies of the caps to the blades, and when the welding has been completed the two caps are parted by severing or breaking the welding that occurs where the caps adjoin.

The machine as set forth in Fig. 1 includes primarily a frame 18 characterized by a rigid horizontally disposed elongate base 19 carried by suitable supporting structure, standards 20 projecting upward from the base and supporting a horizontal top beam or header 21 and having rails 22 extending longitudinally thereof. The rails 22 are carried by the beam or header 21 through suitable brackets, and they extend horizontally along the front and back side of the header 21.

A work carrier 23 is provided on the base 19 and is characterized by an elongate table which is a simple flat horizontally disposed plate like part that is shiftable. A fixture 24 is provided on the carrier 23 to position the parts to be welded and when the carrier is elongate and extends to the forward end portion of the machine the fixture is preferably fixed on or located at the forward end of the carrier. The fixture 24 as provided serves to hold the work and also the flux employed as the welding operation is carried out. A suitable mounting means (not shown) is provided for supporting the carrier 23 on or from the base 19 of frame 18 for free movement or reciprocation of the table lengthwise, and a suitable operating means (not shown) is provided to reciprocate or operate the carrier 23 relative to the base of the frame. A stop means (not shown) is also provided to limit or determine the travel or movement of the carrier 23 relative to the base 19.

A welding head H is provided to carry a welding rod or wire R and in accordance with the invention a mounting M is provided for the welding head H and includes, generally, a vertically disposed spindle A, a carriage B supporting the spindle for rotation about a vertical axis, means C mounting the carriage on the rails 22 of frame 18. A head 28 is carried by the spindle to support the welding head that has a central opening therein adapted to pass a flux handling means D extending vertically through the spindle and to a delivery tube 26. Power handling means E is provided to conduct electrical current through the mounting means M. A drive means F is provided for actuating the carriage B so that it is reciprocated transversely above the forward end portion of carrier 23, and drive means G, later described, is provided for turning the spindle A one step at a time.

The base 19 of frame 18 is an elongate horizontally disposed rectangular unit. The standards 20 of the frame are located at the forward end portion of the base 19 and are spaced apart transversely of the machine, as clearly illustrated in Fig. 1 of the drawings. The standards 20 are like tubular members that carry the header 21 so that it extends horizontally across the machine above the forward end portion of the base 19 and the carrier 23. The rails 22 are carried by the header 21 through suitable brackets and they extend longitudinally of the beam and are horizontaly disposed, as clearly illustrated. The work carrier 23 is provided to support one or more units of work as by means of the fixture 24, and in its prefererd form it is a part of the machine which reciprocates lengthwise of the base beneath the header 21 of the frame 18. The carrier 23 is located at the top of the base, preferably immediately above the top surface thereof.

The spindle A of the mounting M is provided to carry the welding head H and serves to support the head so that the tip thereof delivers the welding rod R at a particular point or in a particular location relative to the carrier 23 and more specifically, relative to the fixture 24, and it supports the head so that it faces downwardly and inwardly toward that point, and so that the head as a whole is rotatable about a vertical axis intersecting at that point and can be moved as desired through a complete circle, that is, through 360°, as circumstances require.

The spindle A is an elongate vertically disposed element supported by carriage B to depend therefrom, and is tubular, being provided with a central tubular passage 27 that extends continuously through the spindle from one end to the other to accommodate the flux handling means D and to the end that flux is delivered to the flux delivery duct 26 (see Fig. 1). The spindle A is supported by carriage B through suitable anti-friction bearings 33, there being upper bearings in the main portion or body 35 of the carriage, and a lower bearing at the lower end of an extension 34 of the carriage, which extension depends a substantial distance below the body 35 of the carriage.

The carriage B of the mounting M is a rigid part shiftably supported beneath the header 21 by the means C hereinafter described to move transversely of the frame 18. The carriage B is provided to support and carry the spindle A and also the flux handling means D and power handling means E, as later described. As clearly illustrated in Fig. 3 of the drawings, the carriage B has a horizontally disposed body 35 with a opening 36 extending vertically therethrough on the central axis of the carriage. An extension 34 depends from the body 35 and is a tubular extension in the nature of a housing that encloses the spindle A and accommodates parts of the power handling means E. The upper bearings 33 are seated in the opening 36 while the lower bearing 33 is seated in the lower end portion of the extension 34. It will be apparent how the spindle is rotatably supported by the bearings 33 and is free to turn on the central vertical axis of the carriage B.

The means C of the mounting M shiftably supports the carriage B so that it is movable transversely of the frame 18. In the preferred form of construction, the carriage B is supported between the rails 22, and there are rollers 37 mounted on opposite sides of the carriage B to engage the tops of the rails 22, while rollers 38 on the sides of the carriage engage the bottom sides of the rails. Since the rails 22 are horizontally disposed and are spaced apart and extending lengthwise of the beam 21 of frame 18, the carriage is supported as just described for reciprocatory movement horizontally above the fixture 24 on carrier 23.

The head 28 at the lower terminal end portion of the spindle A is fixed to the spindle to rotate therewith and is secured to the spindle by means of a retainer or nut 39 on the spindle beneath the block to hold it. A feature of the construction is the insulation of the head 28 from the spindle A (see Fig. 6). As shown, a sleeve 40 of dielectric material is carried over the lower portion of the spindle A below the extension 34 of the housing B and carries the head 28 so that it is electrically insulated from the spindle. Said insulation of the head H is necessary in carrying out the particular welding method involved.

The flux handling means D of the mounting M is provided to conduct flux through the mounting and to the point of welding in order to immerse the welding arc etc. In carrying out the particular welding method involved, a granular flux material is used which is sand-like and abrasive. A flux supply 41 is provided by the present invention and the means D serves to conduct flux to the work immediately before the arc for welding is struck, and it continues to supply flux to the work as the machine operates, to the end that the arc is submerged in or flooded by means of flux, and to the end that there is an ample supply of flux present for welding whereby oxygen is excluded from the weld to prevent burning of the metal etc.

The flux supply 41, as shown in the drawings, includes a flux reservoir 42 supported from the frame 18, as by legs 43 projecting up from the header 21 of the frame, so that the reservoir is located well above the point where the flux is to be delivered. A flexible supply duct 44 extends from the conical bottom 45 of reservoir 42 to the upper end of the spindle A. The duct 44 is preferably a flexible hose maintaining the desired connection between the reservoir and spindle throughout movement of the spindle resulting from reciprocation of the carriage B supporting the spindle.

The flux handling means D involves, generally, a flow control 54 and a delivery tube 46. The tube 46 is in the form of a liner that is received in the tubular spindle A to protect the passage 27 from the abrasive action of the flux passing therethrough. The tube 46 is a straight part and the delivery duct 26 forms a continuation of the tube 46 that is suitably bent and formed to conduct flux to the point of weld. The flow control 45 involves a funnel 47 that is carried by and opens into the tube 46, and a flux controlling valve 48 adapted to be operated by a suitable electro-magnetic operating unit 49. The supply duct 44 empties into the open upper end of the funnel 47 and the valve 48 is opened under control of a timer (not shown) so that it passes the desired amount of flux, which amount is such as to properly flood the arc with flux as the machine goes through its operating cycle. Further, in the particular case illustrated, an agitating means in the form of a vibrator 50 is shown in connection with the parts just described, to prevent choking or clogging, and to assure free flow of flux from the reservoir 42 through the spindle A when the valve 48 is open.

In accordance with the invention, the flow control 45 involves a nozzle 51 that opens at the upper end of the funnel 47, and the valve 48 is a spherical or ball-shaped element that is shiftable relative to and is adapted to open and close the said nozzle. A suitable bracket 52 is carried by and extends upwardly from the body 35 of the carriage B and supports the elements of the flow control 45, except for the funnel 47 that is carried directly by spindle A. As shown, the bracket 52 carries the operating unit 49 for the valve 48, and carries the nozzle 51 on an axis concentric with the spindle A and funnel 47. The supply duct 44 is joined to the nozzle 47 which is a simple tubular part with a lower end 53 in a plane normal to the vertical axis thereof and forming a seat for cooperating with the valve 48. A part is provided for shifting the valve 48 into and out of engagement with the seat at the lower end of the nozzle 51 and it is preferably a lever 54 pivoted at one side of the nozzle and connected to the operating unit 49. Turning of the lever 54 moves the valve 48 vertically, the lever being provided with fingers 55 that confine the ball-shaped valve 48 to the vertically shiftable end portion of the lever 54 (as shown). The valve 48 is made of a soft resilient material, such as rubber or the like, and when in an up position acts to stop the flow of the grannular flux, and when in a down position allows flow to occur, all without choking or clogging.

The welding circuit included in the machine may, in a typical situation, involve a D.C. circuit energized by a motor generator set, or the like, and in accordance with the invention, the welding head H is energized through a plurality of electrical conductors carrying circuits involved in operating the head H and carrying one side of the welding circuit. The other side of the welding circuit is grounded by a strap 56, and in the particular case illustrated the strap 56 is a flexible connection shown connected to the carrier 23.

The welding head H is provided to handle the welding wire or rod R and is carried by an arm 57 extending laterally of the head 28 which in turn is carried by the spindle A. In practice, the welding head H may vary in form and construction depending upon the welding material being handled, the particular work to be acted upon, and various other factors. The particular welding head H illustrated throughout the drawings involves, generally, a drive or rod feeding means 60, a rod guiding means 61 carried by and adapted to receive rod fed by the means 60, and a rod supply means 62 for delivering rod R to the feeding means 60.

The drive or rod feeding means 60 is supported by the spindle A, preferably at or by the lower end portion thereof, and it in turn carries the rod guiding means 61, and also carries the other elements of the head H. The means 60 is characterized by a case 65 adapted to enclose the mechanism of this type, and in the preferred construction the means 60 includes a suitable electrical mechanism within the case 65 engaging the rod R that passes through the case. In practice, any suitable electrical rod or wire feeding mechanism can be employed in carrying out the present invention, and for this reason, this portion of the mechanism is indicated generally. As shown, there is a prime mover or motor 66 mounted on the exterior of the case 65, that rotates a drive wheel 67 within the case. The drive wheel 67 engages with the rod R and when rotated it moves or propels the rod through the case and delivers it to the rod guiding means 61, later described.

The rod feeding means 60 carried in case 65 of the welding head H is electrically operated, causing the welding rod R to be fed to the work at the desired rate. In practice, it is preferred that a motor 66 employed be of the type commonly used in connection with a welding rod feed such as is shown in the drawings, to the end that the feed of welding rod is properly coordinated with the welding action, and as shown, a plurality of circuits is necessary in order to operate such a motor 66.

The guiding means 61 that is provided is adapted to adjustably position the welding head H angularly relative to the vertical rotative axis of the spindle A. As clearly illustrated in Figs. 1 and 3 of the drawings, the welding rod R is fed through the case 65 and through a rod guide on an axis intersecting the vertically disposed axis of the spindle A, to the end that a point of weld is established at the central axis of the spindle regardless of the rotative position thereof. It is to be observed that the angular relationship of the rod R and spindle axis may be varied without displacing the point of weld.

The rod supply means 62 is provided to handle a suitable supply of welding material, that is, a suitable supply of wire or welding rod R. In the particular construction illustrated, the means E includes an upwardly projecting yoke-like bracket 68 on the case 65. The bracket 68 carries a pivot 68' supporting a reel 69 carrying a suitable supply of wire or rod R. The rod R from the reel 69 extends down from the reel to and through the case 65 to be guided to the point of weld. It is a simple matter to apply a reel 69 of welding rod R to the bracket 68 and to direct said rod through the case to be fed by the feeding means 60 to the point of weld.

In accordance with the general arrangement and proportioning of parts, the extension 34 of the carriage B depends a substantial distance below the header 21 so that the reel 69 carried by welding head H is supported in a position laterally offset from the extension 34 and in a vertical position so that it will clear or pass with clearance beneath the header 21 as the spindle A is rotated through a complete circle. The general relationship of parts just referred to is clearly illustrated in Fig. 1 of the drawings.

The electrical circuits for welding and to operate the motor 66 operating the feeding means 60 are communicated to the head H through the power handling means E incorporated in the mounting M at the spindle A, which means includes, generally, an insulator 70 surrounding the spindle A, annular contacts 71 and 72 on and carried by the insulator and within the extension 34 of the carriage B, and brush contacts 73 and 74 suitably insulated and carried by a brush holder 75 supported on the extension 34 to engage and cooperate with the contacts 71 and 72. The welding head H is energized by a power line 76 carrying one side of the welding circuit and by a cable 77 including conductors necessary to complete circuits to the motor 66. The power line 76 extends to the commutating brushes 74, while the conductors of the cable 77 extend to the commutating brushes 73.

The insulator 70 is a sleeve of dielectric material that surrounds the tubular spindle A and it is substantially coextensive with the extension 34 of the carriage B, and it is fixed to the spindle to rotate therewith. The brush holder 75 is fabricated of dielectric material and is located at one side of the extension to carry the brushes 73 and 74 adjacent the periphery of the insulator 70. In practice, suitable springs are used to bias the brushes, as indicated.

The contacts 71 and 72 are ring type contacts carried on the insulator 70 to be contacted by the brushes 73 and 74, respectively. In the particular case illustrated there are six brushes 73 in which case there are six rings 71, and there are two brushes 74 contacting a single ring 72. The rings are suitably spaced apart axially of the spindle A, there being two brushes 74 engaged with the ring 72 in order to handle the heavy currents involved in the welding circuit. In order to carry the circuits from the rings 71 and 72 to the welding head H, the insulator 70 has a substantially thick wall that is provided with longitudinally disposed channels, each channel being in communication with a ring and opening at the lower end of the insulator. As illustrated, a conductor is carried in each channel and is insulated and connected with a ring, said conductors extending to the welding head H. The conductors from the rings 71 extend to the motor 66, while a conductor from the rings 72 extends to the rod guiding means 61.

The means F provided for actuating the carriage B, that is, for reciprocating it, is preferably a power means, and it is shown as a fluid pressure actuated means involving a cylinder and piston mechanism, the cylinder 80 of which is fixed to the beam 22 of the frame, while the piston rod 81 connected to the piston of that mechanism and projecting from the cylinder 80 is connected to the carriage B by a suitable coupling 82. This construction is best illustrated in Figs. 10 and 11 of the drawings. A stop means 83 provided for limiting movement of the carriage B includes opposed stops, preferably adjusting screws 85 carried by the beam 21 and located to be engaged by the carriage B at each end of its stroke. By adjusting the screws 85 the stopping positions of the carriage can be set as desired.

The drive means G is provided by the present invention to turn the spindle A and thereby operate it through a predetermined cycle of operation relative to the carriage B. The drive means G as shown in the drawings includes, generally, a prime mover J, a transmission K operatively connecting the prime mover J to move the spindle A, and a control L for starting and stopping operation of the prime mover. In the particular form of the invention under consideration, that is, where the machine is handling the particular work that has been described, it is preferred that the spindle A be turned through exactly 90° each time it is operated by the drive means G. In this case, the mechanism of the means G as hereinafter described operates so that each time operation of the prime mover J is initiated the mechanism of means G operates to advance or turn the spindle A through exactly 90°.

In the preferred form of the invention the drives F and G are fluid operated drives in which case a suitable fluid pressure supply (not shown) is provided. For instance, a pump delivering fluid at a suitable pressure directs said fluid to a valve 88 controlling flow to the ends of the cylinder 80, and to a valve 89 controlling flow to the prime mover J. As illustrated the valves are solenoid operated, the valve 88 being a four-way valve adapted to control the flow of fluid between the ends of the cylinder to reciprocate the rod 81, the valve 89 being a simple closing valve adapted to open or close the fluid connection to the prime mover J.

The prime mover J provided for driving or rotating the spindle A is preferably a fluid operated power means, and it is shown as a hydraulic motor 90 adapted to be operated by fluid under pressure. The motor 90 has a drive shaft 91 and the transmission K for connecting the prime mover J to the spindle A operatively couples the shaft 91 to the spindle. The transmission K involves, preferably, a chain drive and may include a speed reduction unit 92. In the case illustrated there is a base 93 carried by the body 35 of the carriage B, at the upper side thereof. The reduction unit 92 is mounted on the base 93 and has a drive sprocket 94 on an axis spaced from and parallel to the axis of the spindle. A driven sprocket 95 is carried at the upper end of the spindle A and a drive chain 96 extends between the two sprockets. In order to prevent slack or play, an idler sprocket 97 is provided and is shiftably mounted on the base 93 and is adjustable to tighten the chain 96. The motor 90 is mounted on the case of the reduction unit 92 so that the drive shaft 91 enters the said case to operate the said unit. For instance, the unit 92 may involve a worm wheel 98 driven by a worm gear 99 on the shaft 91.

The control L for starting and stopping the prime mover J is an electrical means and operates to open and close the valve 89 above described. As shown in Fig. 12 of the drawings, the control L involves a starting switch 100, a stopping switch 101, and a relay 102 opened and closed by the switches 100 and 101. The starting switch is a normally open switch that closes an electrical circuit to the winding 103 of the relay 102. The relay has a holding circuit under control of contacts 104, said circuit being under control of the stopping switch 101. Further the relay 102 has contacts 105 that control an electrical circuit to the solenoid of valve 89. In accordance with the invention, a suitable cam 110 is carried at the uppermost end of the spindle A, and in the particular case under consideration it has four equally spaced lobes 111, the lobes being positioned at 90° intervals circumferentially of the cam 110. The stopping switch 101 is supported by a bracket 112 at or adjacent the periphery of the cam 110 so that it is opened by each of the lobes 111. It will be apparent that the actuation of the switch 100 initiates operation of the motor 90 and that actuation of the swich 101 terminates operation of the motor 90. By spacing the cam lobes 111 as required, the spindle A is advanced step by step.

In the particular machine illustrated there are various manually operable controls at 115 which, in practice, are made accessible to the operator of the machine and which, considered generally, are to be used in the setting or adjusting of the machine to control the machine in the event of an emergency. A control for operation of the machine is set forth in Patent 2,835,786.

From the foregoing description it will be understood that the action of the machine may be fully automatic or under control of an operator. The control of the machine has been mentioned in general only and without specific reference to the details of the particular controls that may be employed. The mounting M for the welding head H may be adjusted and operated to weld a wide variety of parts and assemblies of parts. The tip or terminal end of the welding rod R is always fed to the point of weld which is at the central axis of the spindle A, and the spindle A is free to be turned to any rotative position as controlled by the particular cam 110 that is employed. The flux handling means D and the power handling means E effectively communicates the necessary materials and electrical currents to the head H without interfering with the turning thereof, and the drives F and G effectively position the welding head H at the exact point of weld. That is, the drive F laterally shifts the entire carriage B and welding head H, while the drive G rotatively positions the head H. By controlling the valves 88 and 89 as above described the welding head H is positioned as circumstances require.

Having described only a typical preferred form and application of the invention, We do not wish to be limited or restricted to the specific details herein set forth, but wish to reserve to ourselves any variations or modifications that may appear to those skilled in the art and fall within the scope of the following claims.

Having described our invention, we claim:

1. A mounting for a welding head in a fabricating machine wherein said head includes a rod feeding means directing said rod on an axis angularly related to and intersecting an axis of rotation at the point of weld, and including, a spindle mounted to turn on said axis of rotation and carrying said welding head, means commutating electrical power to the welding head and comprising a slip ring and brush assembly at the spindle, and means adapted to turn the spindle predetermined amounts at predetermined times during each cycle of operation of the machine.

2. A mounting for an electrically operated welding head in a fabricating machine wherein said head includes a motor driven rod feeding means directing said rod on an axis angularly related to and intersecting an axis of rotation, and including, a spindle mounted to turn on said axis of rotation and carrying said welding head, means communicating electrical power to the welding head and comprising a slip ring and brush assembly at the spindle and an electrical cable from the spindle to the motor, and means adapted to turn the spindle predetermined amounts at predetermined times during each cycle of operation of the machine.

3. A mounting for an electrically operated welding head in a fabricating machine wherein said head includes a motor driven rod feeding means directing said rod to a guiding means adapted to have electrical contact therewith and on an axis angularly related to and intersecting an axis of rotation, and including, a spindle mounted to turn on said axis of rotation and carrying said welding head, means commutating electrical power to the welding head and comprising a slip ring and brush assembly at the spindle and a conductor from the spindle to the rod guiding means and an electrical cable to the motor, and means adapted to turn the spindle predetermined amounts at predetermined times during each cycle of operation of the machine.

4. A mounting for a welding head in a fabricating machine wherein said head includes a rod feeding means directing said rod on an axis angularly related to and intersecting an axis of rotation, and including, a tubular spindle mounted to turn on said axis of rotation, means conducting material through the spindle to be discharged at the intersection of said axes, and means adapted to turn the spindle predetermined amounts at predetermined times during each cycle of operation of the machine.

5. A mounting for a welding head in a fabricating machine wherein said head includes a rod feeding means directing said rod on an axis angularly related to and intersecting a substantially vertical axis of rotation, and including, a tubular spindle mounted to turn on said axis of rotation, means conducting material through the spindle and comprising, a funnel directing material into the upper end of the spindle and a duct discharging at the lower end of the spindle and at the intersection of said axes, and means adapted to turn the spindle predetermined amounts at predetermined times during each cycle of operation of the machine.

6. A mounting for a welding head in a fabricating machine wherein said head includes a rod feeding means directing said rod on an axis angularly related to and intersecting a substantially vertical axis of rotation, and including, a tubular spindle mounted to turn on said axis of rotation, means conducting material through the spindle and comprising, a valve controlling flow of material to a funnel directing material into the upper end of the spindle and a duct discharging at the lower end of the spindle and at the intersection of said axes, said valve having a nozzle with a seat and a spherical valve element engaging the seat, and normally closing the nozzle, and means adapted to turn the spindle predetermined amounts at predetermined times during each cycle of operation of the machine.

7. A mounting for an electric welding head in a fabricating machine wherein said head includes a rod feeding means directing said rod to a guiding means adapted to have electrical contact therewith and on an axis angularly related to and intersecting a substantially vertical axis of rotation, and including, a tubular spindle mounted to turn on said axis of rotation, means commutating electrical power to the welding head and comprising a slip ring and brush assembly at the spindle and a conductor from the spindle to the rod guiding means, means conducting material through the spindle and comprising, a funnel directing material into the upper end of the spindle and a duct discharging at the lower end of the spindle and at the intersection of said axes, and means adapted to turn the spindle predetermined amounts at predetermined times during each cycle of operation of the machine.

8. A mounting for an electrically operated welding head in a fabricating machine wherein said head includes a motor driven rod feeding means directing said rod on an axis angularly related to and intersecting a substantially vertical axis of rotation, and including, a tubular spindle mounted to turn on said axis of rotation, means commutating electrical power to the welding head and comprising a slip ring and brush assembly at the spindle and an electrical cable from the spindle to said motor, means conducting material through the spindle and comprising, a funnel directing material into the upper end of the spindle and a duct discharging at the lower end of the spindle and at the intersection of said axes, and means adapted to turn the spindle predetermined amounts at predetermined times during each cycle of operation of the machine.

9. A mounting for an electrically operated welding head in a fabricating machine wherein said head includes a motor driven rod feeding means directing said rod to a guiding means adapted to have electrical contact herewith and on an axis angularly related to and intersecting a substantially vertical axis of rotation, and including, a tubular spindle mounted to turn on said axis of rotation, means commutating electrical power to the welding head and comprising a slip ring and brush assembly at the spindle and a conductor from the spindle to the rod guiding means and an electrical cable to said motor, means conducting material through the spindle and comprising, a funnel directing material into the upper end of the spindle and a duct discharging at the lower end of the spindle and at the intersection of said axes, and means adapted to turn the spindle predetermined amounts at predetermined times during each cycle of operation of the machine.

10. A mounting for a welding head in a fabricating machine wherein said head includes a rod feeding means directing said rod on an axis angularly related to and intersecting an axis of rotation, and including, a spindle mounted to turn on said axis of rotation and carrying said welding head, means commutating electrical power to the welding head, and drive means adapted to turn the spindle, and a control whereby the spindle is turned predetermined amounts at predetermined times during each cycle of operation of the machine.

11. A mounting for a welding head in a fabricating machine wherein said head includes a rod feeding means directing said rod on an axis angularly related to and intersecting an axis of rotation, and including, a spindle mounted to turn on said axis of rotation and carrying said welding head, means commutating electrical power to the welding head, and a motor adapted to turn the spindle, and a control having a cam controlling operation of the motor, whereby the spindle is turned predetermined amounts at predetermined times during each cycle of operation of the motor.

12. A mounting for a welding head in a fabricating machine wherein said head includes a rod feeding means directing said rod on an axis angularly related to and intersecting an axis of rotation, and including, a spindle mounted to turn on said axis of rotation and carrying said welding head, means commutating electrical power to the welding head, and a motor adapted to turn the spindle, and a control having a starting switch to initiate operation of the motor and having a cam actuating a stopping switch to stop operation of the motor, whereby the spindle is turned predetermined amounts at predetermined times during each cycle of operation of the motor.

13. A mounting for a welding head in a fabricating machine wherein said head includes a rod feeding means directing said rod on an axis angularly related to and intersecting an axis of rotation, and including, a spindle mounted to turn on said axis of rotation and carrying said welding head, means commutating electrical power to the welding head, and a motor adapted to turn the spindle, and a control having a relay controlling operation of the motor and having a starting switch to close the relay to initiate operation of the motor and having a cam actuating a stopping switch to open the relay to stop operation of the motor, whereby the spindle is turned predetermined amounts at predetermined times during each cycle of operation of the motor.

14. A mounting for a welding head in a fabricating machine wherein said head includes a rod feeding means directing said rod on an axis angularly related to and intersecting an axis of rotation, and including, a horizontally shiftable carriage, a spindle mounted on the carriage to turn on said axis of rotation and carrying said welding head, means commutating electrical power to the welding head, means adapted to shift the carriage, and means adapted to turn the spindle predetermined amounts at predetermined times during each cycle of operation of the machine.

15. A mounting for a welding head in a fabricating machine wherein said head includes a rod feeding means directing said rod on an axis angularly related to and intersecting an axis of rotation, and including, a horizontally shiftable carriage, a tubular spindle mounted on the carriage to turn on said axis of rotation, means conducting material through the spindle to be discharged at the intersection of said axes, means adapted to shift the carriage, and means adapted to turn the spindle predetermined times during each cycle of operation of the machine.

16. A mounting for a welding head in a fabricating machine wherein said head includes a rod feeding means directing said rod on an axis angularly related to and intersecting an axis of rotation, and including, a carriage, means shiftably mounting the carriage for horizontal movement, a tubular spindle mounted on the carriage to turn on said axis of rotation, means commutating electrical power to the welding head, means conducting material through the spindle to be discharged at the intersection of said axes, fluid pressure actuated means adapted to shift the stem and means adapted to turn the spindle predetermined times during each cycle of operation of the machine.

References Cited in the file of this patent

UNITED STATES PATENTS

| | | |
|---|---|---|
| 1,949,251 | Gilbert | Feb. 27, 1934 |
| 2,151,914 | Hopkins | Mar. 28, 1939 |
| 2,402,937 | Stringham | June 25, 1946 |
| 2,442,017 | Price | May 25, 1948 |

FOREIGN PATENTS

| | | |
|---|---|---|
| 681,889 | Great Britain | Oct. 29, 1952 |